US007774352B2

(12) United States Patent
Doherty et al.

(10) Patent No.: US 7,774,352 B2
(45) Date of Patent: Aug. 10, 2010

(54) METHOD OF REVERSING AN ERRONEOUS INVOICE

(75) Inventors: Kimberly L. Doherty, Rensselaer, NY (US); Robert P. Gavazzi, Binghamton, NY (US); Mark E. Kadlecik, Vestal, NY (US); Ann Marie Lukovich, Apalachin, NY (US); Lisa Ann Materski, Lisle, NY (US); Michele Ann Roach, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1592 days.

(21) Appl. No.: 11/048,670

(22) Filed: Feb. 1, 2005

(65) Prior Publication Data

US 2006/0190398 A1    Aug. 24, 2006

(51) Int. Cl.
*G06F 7/00* (2006.01)
(52) U.S. Cl. .................. 707/758; 705/404; 705/403
(58) Field of Classification Search ............. 707/104.1, 707/100, 10, 203
See application file for complete search history.

(56) References Cited

U.S. PATENT DOCUMENTS

| 5,694,551 | A  | * | 12/1997 | Doyle et al. ............. 705/26 |
| 5,970,475 | A  | * | 10/1999 | Barnes et al. ............ 705/27 |
| 6,058,380 | A  |   |  5/2000 | Anderson et al. |
| 6,343,275 | B1 |   |  1/2002 | Wong |
| 6,381,587 | B1 | * |  4/2002 | Guzelsu ................... 705/40 |
| 6,507,826 | B1 |   |  1/2003 | Maners |
| 6,745,229 | B1 | * |  6/2004 | Gobin et al. ............. 709/206 |
| 6,959,287 | B2 | * | 10/2005 | Rabideau et al. ......... 705/30 |
| 7,047,219 | B1 | * |  5/2006 | Martin et al. ............ 705/37 |
| 7,308,434 | B2 | * | 12/2007 | Braverman .................. 1/1 |
| 2001/0039522 | A1 | * | 11/2001 | Saxon ..................... 705/30 |
| 2002/0087345 | A1 | * |  7/2002 | Bly et al. .................. 705/1 |
| 2002/0091597 | A1 | * |  7/2002 | Teng ...................... 705/30 |
| 2002/0143674 | A1 | * | 10/2002 | Beckman .................. 705/34 |
| 2002/0143699 | A1 | * | 10/2002 | Baumann et al. .......... 705/40 |
| 2002/0147668 | A1 | * | 10/2002 | Smith et al. .............. 705/30 |
| 2002/0184147 | A1 | * | 12/2002 | Boulger .................. 705/40 |
| 2003/0083998 | A1 | * |  5/2003 | Ramachandran et al. ... 705/59 |
| 2003/0212617 | A1 | * | 11/2003 | Stone et al. .............. 705/30 |
| 2004/0107153 | A1 | * |  6/2004 | Lundberg ................ 705/35 |
| 2004/0107164 | A1 | * |  6/2004 | Ghiloni et al. ........... 705/40 |
| 2004/0193512 | A1 | * |  9/2004 | Gobin et al. ............. 705/29 |
| 2004/0249725 | A1 | * | 12/2004 | Luo et al. ................ 705/26 |
| 2005/0033668 | A1 | * |  2/2005 | Garcia et al. ............ 705/30 |
| 2005/0144125 | A1 | * |  6/2005 | Erbey et al. ............. 705/40 |

* cited by examiner

*Primary Examiner*—Hosain T Alam
*Assistant Examiner*—Leon Harper
(74) *Attorney, Agent, or Firm*—John R. Pivnichny; Law Office of Jim Boice

(57) ABSTRACT

A method of reversing a plurality of erroneous invoices proffered by a plurality of vendors/suppliers. The method comprises providing a master database for inputting a plurality of vendor invoices, storing a cancellation request for each of the plurality of erroneous invoices in a response database, executing an agent to extract data pertaining to the cancellation request stored for each of the plurality of erroneous invoices from the response database, creating an intermediate file containing data extracted from the response database, executing a delivery component for adding a header record and trailer record to the intermediate file, and for renaming the intermediate file, and executing a bridge program for delivering the intermediate file from the response database into the master database and processing the intermediate file in the master database in order to reverse each of the plurality of erroneous invoices in the master database.

13 Claims, 9 Drawing Sheets

FIG. 2

RTV Request Form                                              200

202 — Creation Date:
      Created By:

210

| | | |
|---|---|---|
| 220 *Group (Area you work in) | Requestor - IPVN (Neg Con) Response ▼ | 211 |
| *System | ● SAP    ○ CAPS | |
| 230 *Region | General Procurement - IPVN (Neg Con) Responses - US/Canada GP1 ▼  231 Choose GP1 If you are responding to an Invoice Payment Verification (IVP - formerly Negative Confirmation Notice) | |
| 240 *Company Code | "0147 = US" ▼  241 | |
| Status | Pending ▼ | |
| AP Processor | ▼ | |
| AP Processor Comments | | |
| 244 Buyer Address | ▼ | |
| *Fiscal Year (Enter the year the original invoice was posted) 250 | 2004 ▼ | |
| SAP RTV Reasons | ▼  251 | |
| Additional Text (200 char max) 252 | | |
| | *This text will be put on the RTV notification back to the supplier.* | |

| Purchase Order Number | SAP Doc # or FET # |
|---|---|
| * | * |
| | |
| | |
| | |
| | |
| | |

Cancel Request Form

Creation Date:
Created By:

| | | |
|---|---|---|
| *Group (Area you work in) | Requestor - IPVN (Neg Con) Response ▼ | 311 |
| *System | ● SAP   ○ CAPS | |
| *Region | General Procurement - IPVN (Neg Con) Responses - US/Canada GP1 ▼ | 331 |
| *Company Code | ▼ | 341 |
| Status | Pending ▼ | |
| AP Processor | ▼ | |
| AP Processor Comments | | |
| Buyer Address | ▼ | |
| *Fiscal Year (Enter the year the original invoice was posted) | 2004 ▼ | |
| *Supplier Notified of problem? | ○ Yes   ○ No | |
| Reason for Cancel | ▼ | 351 |

| Purchase Order Number | SAP Doc # or FET # |
|---|---|
| * | * |
| * | * |
| * | * |

| | Field Name | Field Options |
|---|---|---|
| 410 | Group | Requestor - IPVN (Neg Con) Response/ Requestor<br>Accounts Payable<br>Buyer |
| | Expedite Group<br>R Block Group | OPs Center<br>Buyer |
| 420 | System | SAP<br>CAPS |
| | R Block System | SAP |
| | RTV Mapics System | MAPICS |
| | Other System | CAPS |
| | Expedite MP System<br>Other MP System | MAPICS |
| 430 | SAP Region | General Procurement - IPVN (Neg Con) Responses - US/Canada GP1 I GP1<br>Personal Computing Division - CP2 Production Procurement I CP2<br>Printing Systems Division and Bank Systems Manufacturing - BP1 Production Procurement I BP1<br>Microelectronics Division - EP1 Production Procurement I BP1<br>Systems Group - RP0 Production Procurement I SJP<br>Storage Technology Division - SJP Production Procurement I SJP<br>Procurement Contract Management System / Outsourced Supply Chain - PP1 Production Procurement I PP1<br>Business Continuity and Recovery Sys - IP0 I IP0 |
| 440 | R Block SAP Region | Personal Computing Division - CP2 Production Procurement I BP1<br>Printing Systems Division and Bank Systems Manufacturing - BP1 Production Procurement I BP1<br>Microelectronics Division - EP1 Production Procurement I EP1<br>Systems Group - RP0 Production Procurement I RP0<br>Storage Technology Division - SJP Production Procurement I SJP<br>Procurement Contract Management System / Out sourced Supply Chain - PP1 Production Procurement I PP1<br>Business Continuity and Recovery Sys - IP0 I IP0 |
| | CAPS Region | Northeast - NER<br>Southeast - SER |
| 442 | Company Code | 0147 |
| | EP1 Company Code | 892 |

SAP Bridge Control Totals Report

A) Cotrol totals report

Page x

Run Date: xx/xx/xxxx      Run Time: hh:mm:ss

System:                                      Client:

810 — Total number of records received    :
     812 — Number of Cancel / Repost records    :
     814 — Number of RTV records    :

820 — Total number of records processed successfully    :
     822 — Number of Cancel / Repost records    :
     824 — Number of RTV records    :

830 — Total number of records processed in error    :
     832 — Number of Cancel / Repost records    :
     834 — Number of RTV records    :

840 — Cancel / Repost document detail

| Cancel Code/ SAP doc no /Fisc yr | Cancel Reason | Doc curr Amount | Message |
|---|---|---|---|

842 — Errors:

- 
- 
- 
- 
-

844 — Processed Documents:

SAP Bridge Control Totals Report

850
�ణ RTV Document Detail

Page y

Run Date: xx/xx/xxxx    Run Time: hh:mm:ss

System: xxx                                              Client:

852
| Cancel Code/ SAP doc no /Fisc yr | Cancel Reason | Doc curr Amount | Message |
Errors:
  .
  .
  .
  .
854 .
  .
Processed Documents:
  .
  .
  .
  .
  .
  .

METHOD OF REVERSING AN ERRONEOUS INVOICE

FIELD OF THE INVENTION

The present invention relates to a method of automatically reversing an erroneous invoice proffered by a vendor/supplier.

BACKGROUND OF THE INVENTION

Organizations/corporations process numerous vendor/supplier invoices on a daily basis. As such, whenever there is an error in an invoice that has already been processed or entered into an organization's accounts payable system, the process of canceling or returning an erroneous invoice to a respective vendor/supplier tends to be manually intensive in that some person has to analyze the problem with the particular invoice and has to take the appropriate steps to correct the problem with the invoice that was already entered into the organization's invoice processing system. Thus, it has become imperative that organizations/corporations examine the resources needed to manually process such erroneous vendor/supplier invoices in order to improve efficiency and to facilitate the automation of processing or reversing erroneous vendor/supplier invoices.

SUMMARY OF THE INVENTION

In a first aspect of the invention, there is provided a method of canceling a plurality of erroneous invoices proffered by a plurality of vendors/suppliers. The method comprises providing a master database for inputting a plurality of vendor invoices, storing a cancellation request for each of the plurality of erroneous invoices in a response database, executing an agent to extract data pertaining to the cancellation request stored for each of the plurality of erroneous invoices from the response database, creating an intermediate file containing data extracted from the response database, executing a bridge program for delivering the intermediate file from the response database into the master database and processing the intermediate file in the master database in order to cancel each of the plurality of erroneous invoices in the master database. The method further comprises generating a summary report for passed and failed cancellation requests corresponding to each of the plurality of erroneous invoices processed in the master database. The providing a master database step further comprises sending invoice notification to respective requesters corresponding to each of the plurality of vendor invoices inputted into the master database and the storing step further comprises entering a cancellation request for each of the plurality of erroneous invoices proffered by one or more vendors in the response database. Further, the executing a bridge program step comprises first executing a delivery component in the response database for adding a header record and a trailer record to the intermediate file, and renaming the intermediate file. Moreover, the processing step further comprises adding text to the plurality of erroneous invoices in the master database corresponding to the cancellation request entered in the response database, and generating a reversal entry for each of the plurality of erroneous invoices in the master database.

In another embodiment of the invention, there is provided a method of returning-to-vendor an erroneous invoice proffered by a vendor. The method comprises inputting a plurality of vendor invoices into a master database, sending invoice notification to respective requesters corresponding to each of the plurality of vendor invoices inputted into the master database, storing a return-to-vendor request from a requestor for the erroneous invoice in a response database, executing an agent to extract data pertaining to the stored return-to-vendor request for the erroneous invoice from the response database, generating an intermediate file containing data extracted from the response database, executing a bridge program for delivering the intermediate file from the response database into the master database, processing the intermediate file in the master database in order to return to vendor the erroneous invoice, and sending communication regarding the erroneous invoice to the vendor. The executing a bridge program step further comprises first executing a delivery component for adding a header record and a trailer record to the intermediate file, and renaming the intermediate file. Further, the processing step comprises adding text to the erroneous invoice in the master database corresponding to the return-to-vendor request entered in the response database, and generating a reversal entry for the erroneous invoice in the master database. Furthermore, the sending communication step comprises sending communication to the vendor regarding the erroneous invoice with added text corresponding to the return-to-vendor request, and sending a reversal invoice notification to the requestor for the erroneous invoice.

In yet another embodiment of the invention, there is provided a programmable media containing programmable software to reverse a plurality of erroneous invoices proffered by one or more vendors. The programmable software comprises the steps of inputting into a master database a plurality of vendor invoices, sending invoice notification to respective requesters corresponding to each of the plurality of vendor invoices inputted into the master database, storing, in a response database, reversal requests from a subset of the respective requestors corresponding to each of the plurality of erroneous invoices, executing, in the response database, an agent to extract data pertaining to each of the plurality of erroneous invoices from the response database, generating an intermediate file containing data extracted from the response database, executing a bridge program for delivering the intermediate file generated from the response database into the master database, and processing, in the master database, the intermediate file to create a reversal entry for each of the erroneous invoices in the master database. In a preferred embodiment, the reversal request for the plurality of erroneous invoices comprises one of canceling invoice and returning-to-vendor invoice. The executing a bridge program further comprises first executing a delivery component for adding a header record and a trailer record to the intermediate file, and renaming the intermediate file. Further, the processing step comprises adding text to each of the plurality of erroneous invoices in the master database corresponding to the reversal request entered in the response database, sending a reversal invoice notification to the subset of the respective requesters corresponding to each of the plurality of erroneous invoices, and sending communication to a respective vendor regarding an erroneous invoice, if the erroneous invoice is processed as being returned to vendor.

In a preferred embodiment, the response database is on a first server, and the master database is on a second server. Also, in a preferred embodiment, the intermediate file is a flat file, whereas, preferably, the master database is a SAP® database, and preferably, the response database is a Lotus Notes® database.

BRIEF DESCRIPTION OF THE DRAWINGS

The accompanying drawings which are incorporated in and form a part of this specification, illustrate embodiments of the invention and, together with the description, serve to explain the principles of the invention:

FIG. 2 shows an example of a Return-to-Vendor (RTV) Request Form, in accordance with an embodiment of the invention.

FIG. 3 shows an example of a Cancel Request Form, in accordance with an embodiment of the invention.

FIGS. 4A-4B show a list of the drop-down menu options for the different fields in the Return-to-Vendor (RTV) and Cancel Request forms, in accordance with an embodiment of the invention.

FIGS. 8A-8B show an example of a SAP Bridge Control Totals Report, in accordance with an embodiment of the invention.

BEST MODE FOR CARRYING OUT THE INVENTION

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
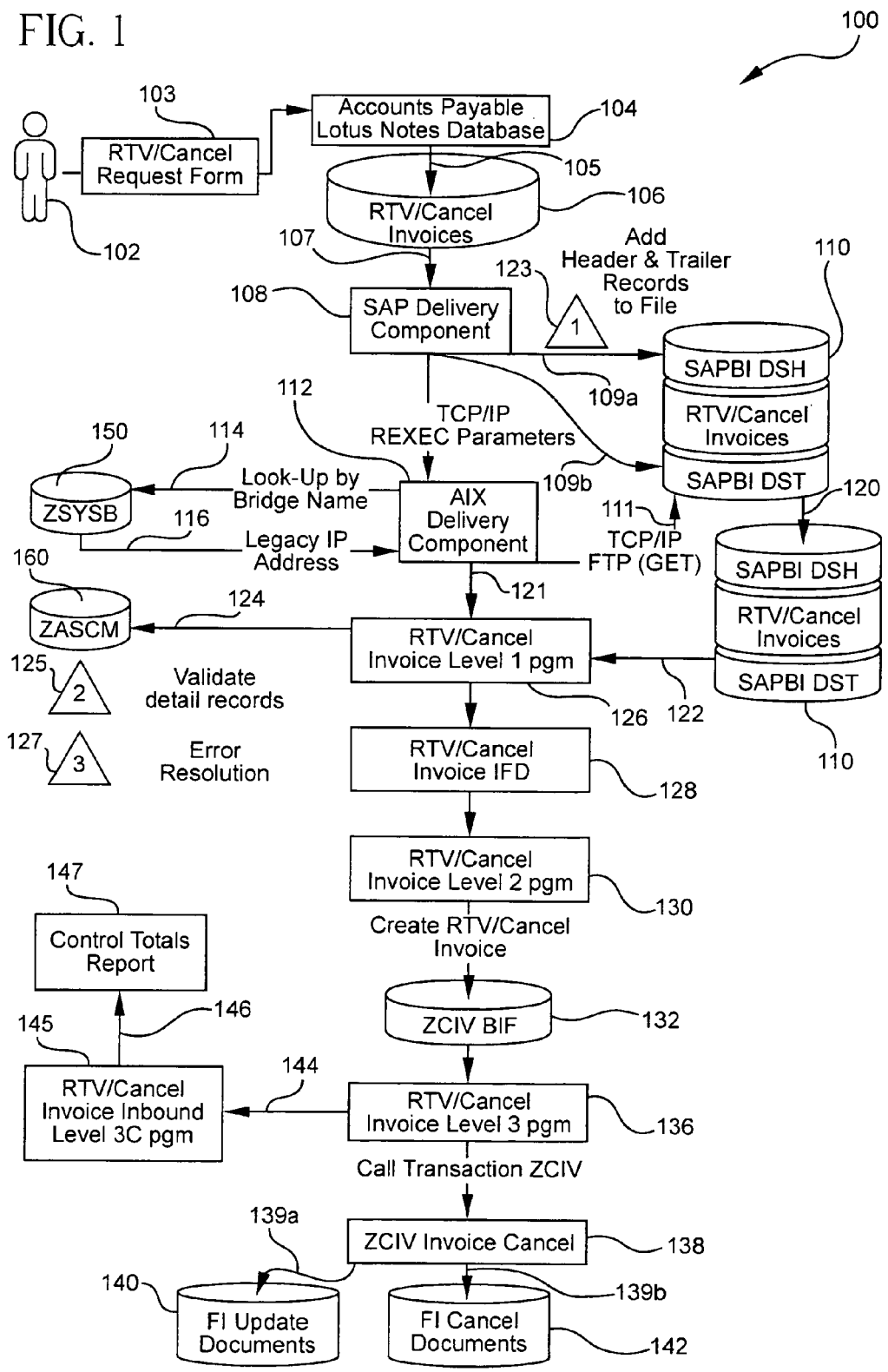
FIG. 1 is a flowchart demonstrating a method of reversing an erroneous invoice, in accordance with an embodiment of the present invention.

In one embodiment, the present invention provides a method of reversing a plurality of erroneous invoices entered into an Accounts Payable (AP or A/P) system, such as, the commercially available SAP® R/3 Accounts Payable software application module, manufactured by SAP Aktiengesellschaft Joint Stock Company (SAP AG). As used herein, the term "reversing" is intended to include the automated process of either canceling an invoice or returning-to-vendor (RTV) an invoice, as shown in the flowchart of FIG. 1. In both instances, the invoice is "canceled" in that a reversal entry or reversed entry (separate document) is created within the SAP® database system. However, in the case of an invoice being returned to the vendor (for example, when an invoice processor makes a mistake in entering the invoice into an accounts payable system), the automated process further includes generating a notification that is sent to the vendor explaining why the invoice is being returned to the vendor and will not be paid, whereas, for a cancelled invoice (for example, when a requestor does not receive the goods mentioned in the invoice), a notification is not sent to the vendor given that the requestor notifies the vendor directly.

Turning to a method of canceling an erroneous invoice, the method comprises providing a master database, preferably, a SAP® R/3 Accounts Payable database, for inputting a plurality of vendor/supplier invoices proffered by respective vendors/suppliers and sending invoice notification to respective requestors corresponding to each of the plurality of vendor/supplier invoices inputted into the master database. In a preferred embodiment, the invoice notification sent to the respective requestors is via the Lotus Notes® e-mail software component owned by International Business Machines Corporation (IBM). Further, the method comprises entering a cancellation request for each of the plurality of erroneous invoices proffered by one or more vendors in a response database and storing the cancellation request for each of the plurality of erroneous invoices in the response database. In a preferred embodiment, the response database is an IBM Lotus Notes® Accounts Payable Response Database. The method of canceling an erroneous invoice further comprises executing an agent or program to extract data pertaining to the cancellation request stored for each of the plurality of erroneous invoices from the response database, creating an intermediate file or an input file containing data extracted from the response database, and executing a bridge program for delivering the intermediate file or input file from the response database into the master database. The step of executing a bridge program further comprises first executing a delivery component, preferably, in the response database for adding a header record and a trailer record to the intermediate file and renaming the intermediate file. The method further comprises processing the intermediate file in the master database in order to cancel each of the plurality of erroneous invoices in the master database. The processing step further comprises adding text to the plurality of erroneous invoices in the master database corresponding to the cancellation request entered in the response database, and generating a reversal entry for each of the plurality of erroneous invoices in the master database, preferably, the SAP® database.

For instance, when a requestor at an organization orders goods through the organization's requisition system, a requisition is created for the ordered goods. The requisition has a requisition tracking number and contains the requestor's information, such as name, phone number, address, employee number, etc. The requisition in the requisition system gets interfaced into the SAP® system. In particular, a purchase order is created from that requisition. The purchase order in the SAP® system has its own unique purchase order number, but retains the link to the requisition tracking number. When invoices are received from respective vendors/suppliers, each invoice is processed by entering the invoice into the SAP® system against a purchase order. The SAP® system creates an invoice file, which is sent to the requisition system. The requisition system uses the requisition tracking number to retrieve/pull in the requestor's information for each invoice in the file. Once the requisition system has retrieved the requesters' information for all the entered invoices, a job (a program) in the requisition system automatically populates the fields contained in an appropriate format for a standard notification that is sent to each of the respective requestors corresponding to the entered invoices. Further, the job in the requisition system puts all of the invoice and requestor information into a standard e-mail notification that is sent to the respective requesters using IBM's Lotus Notes® e-mail software component. It is this e-mail notification to the requestors that triggers the invoice validation process. More specifically, in the e-mail notification, there is a link to the response database, namely, IBM's Lotus Notes® Accounts Payable Response Database.

Figure 4B:
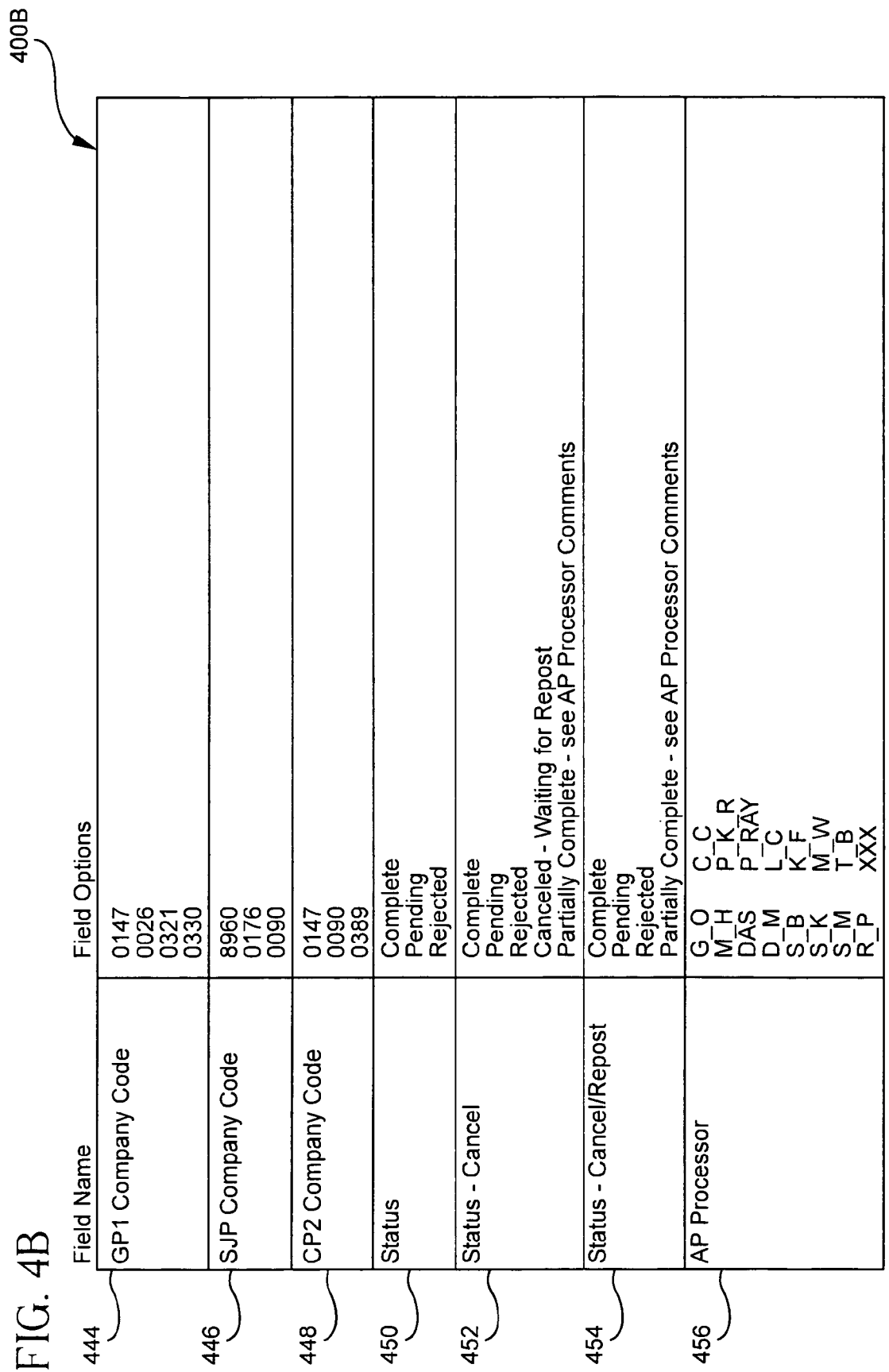
Figure 5:
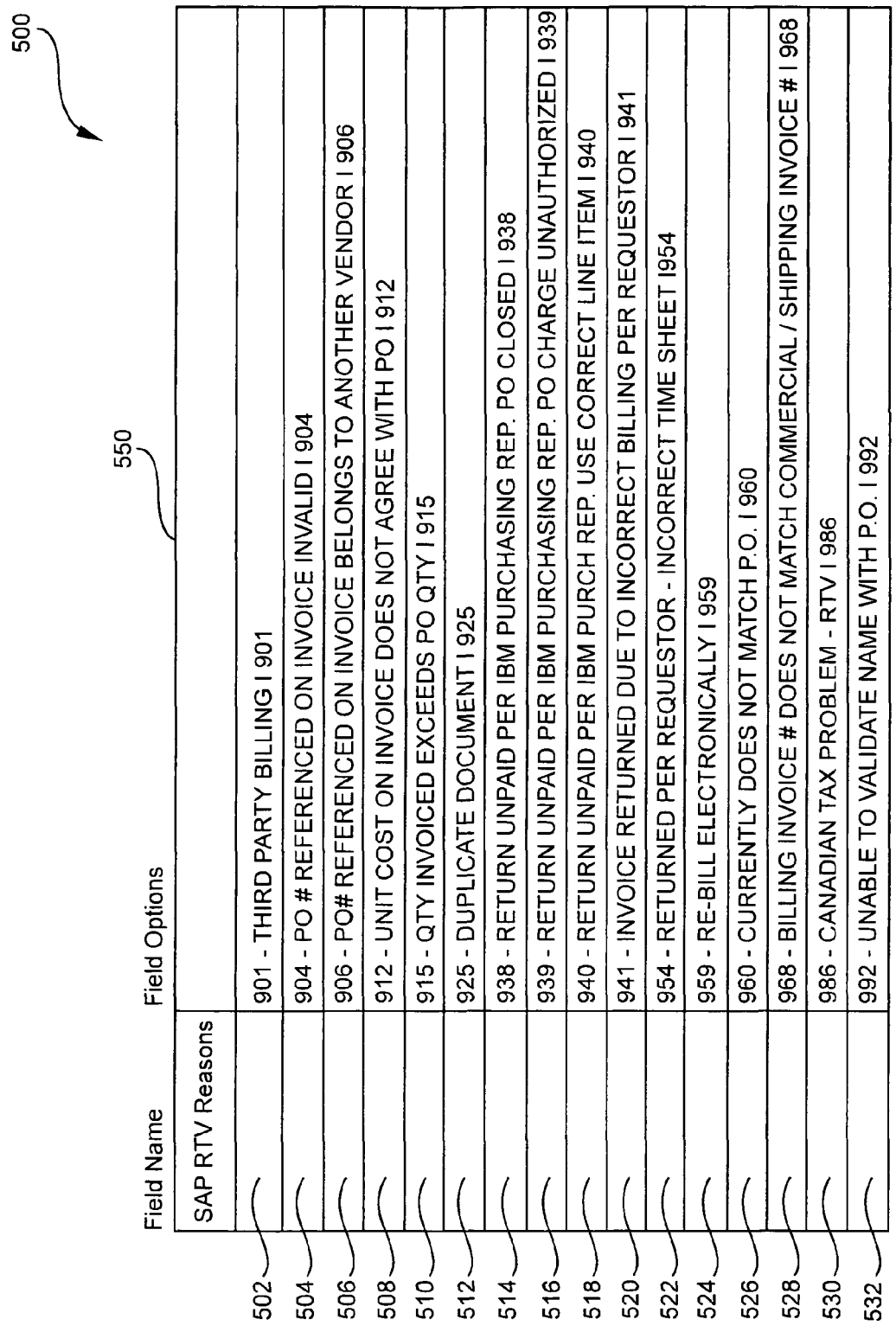
FIG. 5 is an exemplary list of possible reasons to Return-to-Vendor (RTV) an erroneous invoice, in accordance with an embodiment of the invention.
Figure 6:
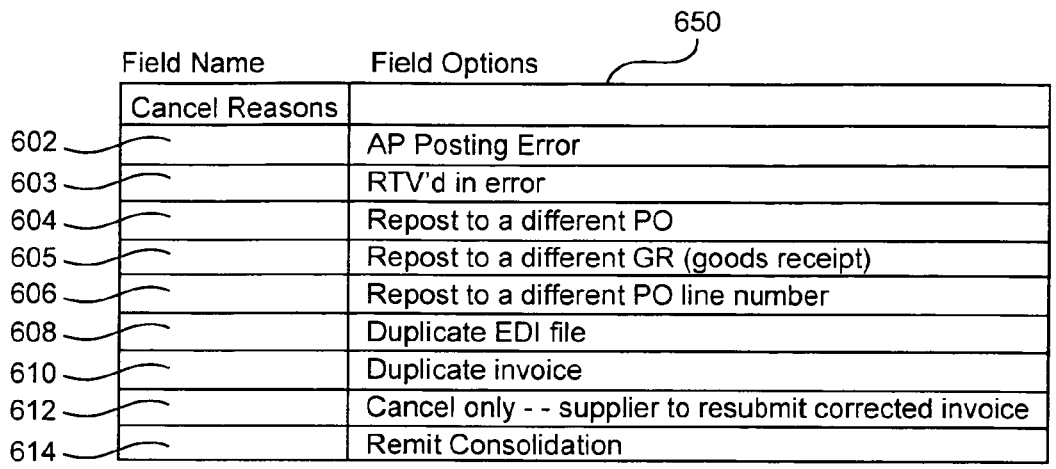
FIG. 6 is an exemplary list of possible reasons to cancel an erroneous invoice, in accordance with an embodiment of the invention.

If there is a problem with a particular invoice, a requester accesses the response database via the link in the e-mail notification and fills out an appropriate form, that is, either a RTV (Return-to-Vendor) Request Form (see FIG. 2) or a Cancel Request Form (see FIG. 3) in the Lotus Notes® Accounts Payable Response Database. Each of the respective request forms contains a few key fields, such as, a "Creation Date" and a "Created By" field (numerals 202 and 302 in the respective forms shown in FIGS. 2 and 3). The respective forms also contain a field for the area that the requestor works in, which is called a "Group" field (numeral 210 in the RTV Request Form of FIG. 2 and numeral 310 in the Cancel Request Form of FIG. 3), a "System" field (numeral 220 in the RTV Request Form of FIG. 2 and numeral 320 in the Cancel Request Form of FIG. 3), a "Region" field (numeral 230 in the RTV Request Form of FIG. 2 and numeral 330 in the Cancel Request Form of FIG. 3), a "Company Code" field (numeral 240 in the RTV Request Form of FIG. 2 and numeral 340 in the Cancel Request Form of FIG. 3), a "Fiscal Year" field (numeral 244 in the RTV Request Form of FIG. 2 and numeral 344 in the Cancel Request Form of FIG. 3), a "Purchase Order Number" field (numeral 260 in the RTV Request Form of FIG. 2 and numeral 360 in the Cancel Request Form of FIG. 3), a "SAP document number or FET number" field (where, the FET number is the Front End Table number assigned to an invoice when the invoice is being held in a table referred to as the Front End Table, which conducts a match for goods received versus quantity ordered), and is designated numeral 270 in the RTV Request Form of FIG. 2 and numeral 370 in the Cancel Request Form of FIG. 3). There is an "Additional Text" field (numeral 252) in the RTV Request form shown in FIG. 1. The requestor completes the appropriate RTV Request Form (FIG. 2) or Cancel Request Form (FIG. 3) by utilizing the pull-down menus (numerals 211, 231, 241, 251, etc. in FIG. 2 and numerals 311, 331, 341, 351, etc. in FIG. 3) which provide various options for each of the corresponding fields shown in the respective RTV Request Form (FIG. 2) and Cancel Request Form (FIG. 3). In particular, table 400A in FIG. 4A and table 400B in FIG. 4B show a list of the drop-down menu options under the "Field Options" column for the fields that are included in both the Return-to-Vendor (RTV) Request Form (FIG. 2) and the Cancel Request Form shown in FIG. 3. More particularly, the "Group" field 210 shown in FIG. 2, has several field options that are shown under the column "Field Options" in row 410 in FIG. 4A. For instance, for the "Group" field 210 in FIG. 2 and the "Group" field 310 in FIG. 3, a requestor can choose either Requestor, Accounts Payable or Buyer as shown in the "Field Options" column in row 410 of FIG. 4A. Similarly, the requestor can select the appropriate "System" (SAP or CAPS (another accounts payable system that may be used by an organization) shown in row 420 of the "Field Options" column in FIG. 4A. Further, the requestor completes the remainder of the RTV or Cancel Request Form by selecting from the various drop-down options (231, 241, 251, etc.) provided in the RTV Request Form of FIG. 2 or the drop-down options (331, 341, 351, etc.) provided in the Cancel Request Form of FIG. 3. For instance, the requestor selects one of the options listed in the "SAP Region" row 430 in FIG. 4A. Similarly, the requester selects an option for the "Company Code" field (row 440 in FIG. 4A). The company code is further subdivided based on the instances of the SAP® system being used, such as an "EP1 Company Code" option (row 441 in FIG. 4A), a "GP1 Company Code" option (row 444 in FIG. 4B), a "SJP Company Code" option (row 446 in FIG. 4B) and "CP2 Company Code" option (row 448 in FIG. 4B). Preferably, EP1, GP1, SJP and CP2 represent separate business units within the organization that have separate instances of the SAP® system. Moreover, the requestor completes the "SAP RTV Reasons" field 250 in FIG. 2 and the "Reason for Cancel" field 350 in FIG. 3 by selecting from a drop-down menu 251 shown in FIG. 2 and a drop-down menu 351 shown in FIG. 3. The drop-down menu options for the "SAP RTV Reasons" field 250 in FIG. 2 are shown in FIG. 5. As shown in FIG. 5, the "Field Options" column 550 provides an exemplary list of various reasons why an invoice may be returned to the vendor, where each RTV reason has associated with it a specific "9xx" code. For instance, an invoice may be returned because of "Third Party Billing" issues (code 901, shown in row 502 of column 550 in FIG. 5), or because of "Purchase Order Number (PO #) Referenced on Invoice Invalid" (code 904, row 504), or because the "PO # referenced on the invoice belongs to another vendor" (code 906, row 506). As shown in FIG. 5, rows 508, 510, 512, 514, 516, 518, 520, 522, 524, 526, 528, 530 and 532 each have a RTV reason with a specific 9xx code associate with it. Similarly, FIG. 6 provides an exemplary list of various reasons in the "Filed Options" column 650 of why an invoice may be canceled. For instance, an invoice may be canceled because of an AP (Accounts Payable) Posting Error (listed in row 602 of column 650 in FIG. 6) or because the invoice is "RTV'd in error" (listed in row 603 of column 650) or due to any of the other cancel reasons listed in rows 604, 605, 606, 608, 610, 612 and 614 in FIG. 6. Further, each of the cancel reasons shown in FIG. 6 has associated with it a specific "0xx" code, which is not specified in FIG. 6. Also, with reference to the cancellation of an invoice, when a requestor completes the Cancel Request Form in FIG. 2, the requestor indicates in field 346 (by selecting either the "Yes" or No" buttons) whether or not the supplier was notified of the problem. If the requestor selects "No" (that is, did not notify the vendor/supplier), the requester is directed to fill out the RTV Request form instead. Further, as shown in FIGS. 2 and 3, under the "Company Code" field 240 and 340, respectively, there is a drop-down field for "Status" and "AP Processor", which is selected from the corresponding rows 450, 452, 454 and 456 in FIG. 4B. Accordingly, the requestor selects the appropriate reason for either canceling an invoice or returning an invoice to the vendor and submits the completed request form, which is stored in the response database.

Referring to FIG. 1, when a requester 102 wants to cancel an invoice, the requester completes a Cancel Request Form 103 (an example of which is shown in FIG. 3). The cancellation request data contained in the completed Cancel Request Form (designated numeral 103 in FIG. 1) is stored or saved in a response database (designated by numeral 104), preferably, in the IBM Lotus Notes® Accounts Payable (AP) Response Database. At some predetermined periodic time period, preferably, at the end of each business day, an agent, that is, a program within the Lotus Notes® Accounts Payable Response Database 104 is executed to extract (indicated by numeral 105) the pertinent information from all the completed cancellation request forms 103 that have been stored in the response database 104. The agent creates an intermediate file or an input file (designated numeral 106) from all the cancellation request entries or forms 103 stored in the Lotus Notes® Accounts Payable Response Database 104 for processing through the SAP® AP system (not shown in FIG. 1). Preferably, the intermediate or input file 106 is a flat file, that is, a file that contains cancellation request data in the form of lines of text of a certain uniform length, with each line representing a separate request form or entry. The agent names the flat file 106 in a specific format and stores the flat file 106 in a designated directory on a specified server, preferably, on the same server as the Lotus Notes® software system. The flat file 106 contains all of the information required by the SAP® Accounts Payable system to automatically cancel an erroneous invoice. Preferably, the flat file 106 contains the information pulled from each of the cancellation request forms (FIG.

3), such as, company code (340), SAP document number (370), reason for cancel (350), etc., so that the flat file 106 can bridge directly form the Lotus Notes® Response Database 104 into the SAP® system. In a preferred embodiment, the flat file 106 bridges directly form the Lotus Notes® Response Database 104 to the SAP® system via a SAP bridge program called "IB_END_RTV", referred to herein as "the SAP Inbound bridge" or "the SAP bridge IB_END_RTV" or simply as "the bridge program". Furthermore, there are certain control points (designated by a triangle symbol with a number in it) for the delivery of the flat file 106 from the Lotus Notes® response database to the SAP® system. The first control point 123 is within the Notes® response database system (designated in FIG. 1 by triangle 123 with the number 1 in it) and ensures the proper attachment of the header record and trailer record to the flat file. The second control point 125 (designated in FIG. 1 by triangle 125 with the number 2 in it) is after the flat file has been received into the SAP® system, the header record and trailer record detail is validated against the flat file details to ensure that what was sent by the Lotus Notes® response database system is what is received by the SAP® system. Finally, the third control point 127 (designated in FIG. 1 by triangle 127 with the number 3 in it) is to deal with any bridge processing errors reported after the flat file has been processed by the SAP® system.

In particular, the agent or program that creates the flat file is executed (depicted by the numeral 105) at a specified time, preferably, prior to any payment run, such that, the agent collects all the information in the cancel request forms 103 entered and stored in the Lotus Notes® Accounts Payable Response Database 104 and creates the flat file 106, such that the SAP® bridge IB_END_RTV can pick up the flat file 106 and begin processing the flat file in order to transfer the flat file 106 data into the SAP® system. Preferably, at a designated time after the expected time that the agent would have created/generated a flat file 106 on the AP Response Database, a scheduled "cron job" (not shown in FIG. 1) is executed in the SAP® system. The scheduled "cron job" is a program within the SAP® system that is scheduled to be executed at a certain time. The "cron job" when executed in the SAP® system goes out to the Lotus Notes® Accounts Payable Response Database 104 and checks within a specific Lotus Notes® directory on a designated server where the intermediate file or flat file 106 is supposed to be stored to see if there is a flat file 106. If the cron job finds a flat file, the cron job triggers the execution of a SAP® delivery component (designated by numeral 108 in FIG. 1) named "saprun", which is a SAP® code or program that is run on the Lotus Notes® Accounts Payable Response Database 104.

The SAP® delivery component "saprun" 108 attaches a header record (as shown by numeral 109*a*) and trailer record (as shown by numeral 109*b*) to the flat file 106 and renames the flat file. In particular, the SAP® delivery component "saprun" 108 attaches a header record, SAPBI DSH that includes a bridge name, collection number and document, and further attaches a trailer record, SAPBI DST, that includes end of file record with a record count. In a preferred embodiment, SAPBI DSH is a 'record identifier' value, which indicates that the record in the file is a header record, whereas, SAPBI DST is a 'record identifier' value, which indicates that the record in the file is a trailer record. The flat file with the attached header record and trailer record is designated by numeral 110 in FIG. 1. If the SAP® delivery component "saprun" 108 is executed successfully (control point 123 in FIG. 1), it triggers the execution of the SAP® bridge program IB_END_RTV in the SAP® system.

Turning to the SAP bridge program, the SAP bridge program "IB_END_RTV" is comprised of several program components (not all of the individual bridge program components are shown in FIG. 1). The SAP bridge program is used to deliver the flat file 106 into the SAP® Accounts Payable system (as shown by the arrow designated by numeral 120). In particular, an AIX® delivery component 112, which is part of the SAP® bridge program IB_END_RTV, goes and gets the flat file 110 (as shown by numeral 111 TCP/IP FTP(GET)) from the Lotus Notes® Accounts Payable Response Database server and brings it into the SAP® system server for processing. The AIX® delivery component 112 receives the flat file 110 in the SAP® system and verifies the presence of a header record and trailer record on the flat file 110 (control point 125 in FIG. 1). In particular, the AIX® delivery component of the SAP® IB_END_RTV bridge program verifies that the expected record count in the trailer record of the flat file equals the system generated record count and, if successful, the SAP® IB_END_RTV bridge program receives the flat file into SAP® system and continues to process the flat file 110. The AIX Delivery Component 112 also looks up (indicated by numeral 114) in a table ZSYSB 150 the name of the flat file 110 and looks up the location (indicated by numeral 116) of the flat file 110 in the table ZSYSB 150. The table ZSYSB 150 has a definition of the server name of the Lotus Notes® Database 104 as well as the name of the flat file 110. Once the flat file is brought into the SAP® system (indicated by numeral 120), the bridge program SAP® IB_END_RTV is executed to further process the file (indicated by numeral 122). The IB_END_RTV SAP® bridge program is preferably comprised of three (3) programming or program levels, namely, a Level 1 program, a Level 2 program and a Level 3 program. The Level 1 program (designated by numeral 126) validates the intermediate or input file (flat file 110), performs controls measurements, and maps the flat file data to an IFD (Interface Document 128). The Level 2 program (designated by numeral 130) creates the specific screen data ZCIV BIF (Bridge Infrastructure Document, designated by numeral 132), which is needed to execute a SAP® transaction called ZCIV (designated by numeral 138). The ZCIV transaction 138 is a customized program created for the SAP® system. The Level 3 program (designated by numeral 136) creates the BDC (Batch Data Communication) which calls/executes the SAP transaction ZCIV 138. Accordingly, the SAP® bridge program IB_END_RTV opens up the flat file 110 and executes the ZCIV transaction 138 to process each line in the flat file 110. The flat file 110 contains all the information necessary for the SAP® system to automatically execute the ZCIV transaction 138 to process each line of the flat file 110 in order to cancel each of the erroneous invoices in the SAP® system.

In a preferred embodiment, the ZCIV transaction 138 achieves or automates two separate functions or steps, as designated by numerals 139*a* and 139*b* in FIG. 1. The first function of the ZCIV transaction is to create (as indicated by the numeral 139*a*) an updated document 140 and the second function of the ZCIV transaction is to cancel the invoice document (designated by 139*b*) by creating a reversal document 142, which "zeros" out the invoice, thus, not paying the erroneous invoice. In particular, the ZCIV transaction creates an updated document 140 of the erroneous invoice corresponding to a particular line of the flat file 110 by adding a specific code (preferably, a three digit code) to the erroneous invoice explaining the particular reason why the invoice is being canceled. As shown in FIG. 6, there are many reasons for canceling an invoice, and each of the cancel reasons shown in rows 602 through 614 in column 650 of FIG. 6 has a specific "0xx" code (not shown in FIG. 6) that is linked via a table to the cancel reasons listed in column 650. For instance, in row 602 of FIG. 6, the field option "AP Posting Error" has a specific 0xx code that is associated with it. Upon execution of the ZCIV transaction 138, the ZCIV transaction 138 adds the specific 0xx code (in the step designated by numeral 139a) to create an updated document 140 and the ZCIV transaction creates (in the step designated by numeral 139b) a reversal or cancel document 142, thus, canceling the erroneous invoice in question. In a preferred embodiment, the ZCIV transaction 138 updates each corresponding invoice to be canceled by adding the 0xx code to an invoice field called "memo text". Preferably, when an erroneous invoice entry is reversed, the updated or reversal document 142 created in the SAP® system gets assigned a separate unique SAP® document number, which is different from the original SAP® document number on the erroneous invoice. Furthermore, preferably, an e-mail notification is sent to the requester providing the requester with the pertinent information regarding the cancellation of the erroneous invoice, along with the reversal document 142 information.

Furthermore, the method comprises generating a summary or reconciliation report for passed and failed cancellation requests corresponding to each of the plurality of erroneous invoices processed in the master database, namely, the SAP® database. Preferably, once the SAP® bridge program has completed running, a reconciliation report, referred to as the "SAP Bridge Control Totals Report" or simply as the "Control Totals Report" is generated (as shown by numeral 147 in FIG. 1). Preferably, a sub-module Level 3C program (numeral 145 in FIG. 1) of the Level 3 program 136 generates the Control Totals Report 147. Referring to FIGS. 8A and 8B, numerals 800A and 800B show an example of a Bridge Control Totals Report, which provides the results of the automatic reversing of a plurality of erroneous invoices. The SAP Bridge Control Totals Report, as shown by numeral 800A in FIG. 8A checks what was received (in line 810) from the AP Response Database, including any additional RTV's and Cancels entered manually into the AP Response Database, for example via the Procurement Operations (OPs) Center Database, with the number of records processed successfully (in line 820) and the number of records processed in error (in line 830) through the SAP® system. What was received from the AP Response Database and the OPs Center Database must equal the total number of records processed successfully and in error through the SAP® system. The "Total number of records received" section (line 810) of the reconciliation or Control Totals Report 147 is further broken down into two sub-sections. There is a sub-section for "number of cancel/repost records" (line 812) and "Number of RTV Records" received (line 814). Similarly, the "Total number of records processed successfully" section (line 820) is also broken down into two sub-sections. There is a sub-section for "Number of Cancel/Repost records" processed successfully (line 822) and "Number of RTV records" processed successfully (line 824). Further, the "Total number of records processed in error" section (line 830) is also broken down by the "number of cancel/repost records" (line 832) and the "number of RTV records" (line 834) that were processed in error. Further, the reconciliation report section 800A in FIG. 8A has a "cancel/repost document detail" section (line 840), which further provides details (Cancel Reason, etc.) on the cancel/repost invoices that were processed in error (line 842 in FIG. 8A) and those invoice that were processed successfully (line 844 in FIG. 8A). Similarly, the reconciliation report section 800B in FIG. 8B has a "RTV document detail" section (line 850), which further provides details on the RTV invoices that were processed in error (line 852 in FIG. 8B) and those invoice that were processed successfully (line 854 in FIG. 8B).

Figure 7:
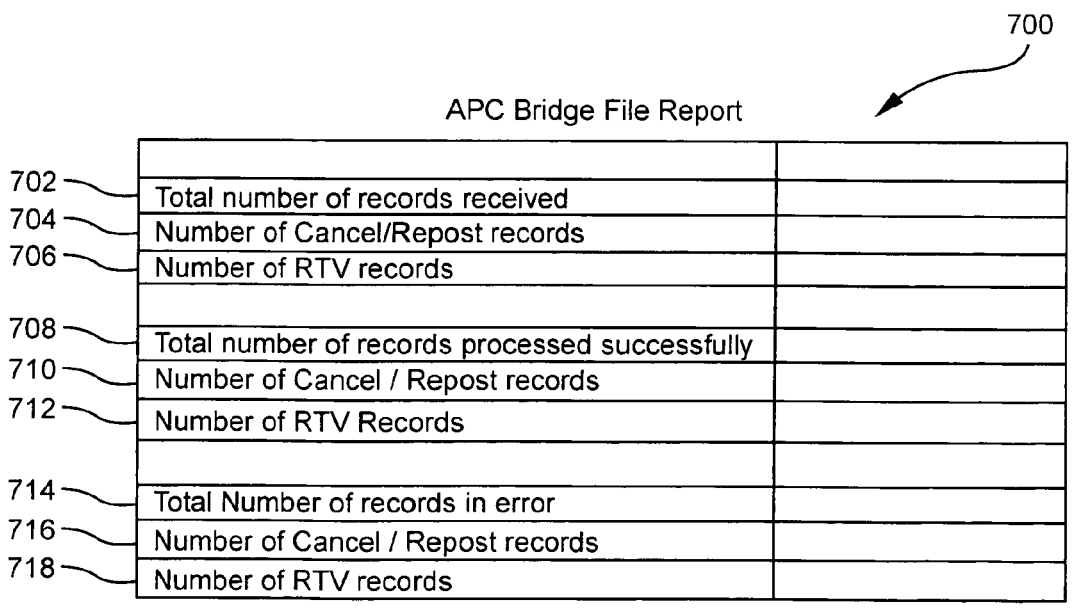
FIG. 7 shows an example of an APC (Accounts Payable Center) Bridge File Report, in accordance with an embodiment of the invention.

Alternatively, as mentioned herein above, erroneous invoices may be entered/inputted into the AP Response Database through an organization's procurement department (not shown in any of the drawings). In particular, the procurement department works on erroneous invoices and enters them into the OPs (Procurement Operations) Center Database. An agent (program) in the AP Response Database reads the forms from the OPs Center database and automatically creates a corresponding form in the AP Response Database, which then can be fed into the SAP® system. FIG. 7 shows an example of a reconciliation or verification report, referred to as an "APC (Accounts Payable Center) Bridge File Report" (designated by numeral 700) that reconciles or verifies the number of records that were sent by the OPs Center database with records that were actually received by the Accounts Payable Response Database. In particular, the APC Bridge File Report 700 breaks down the data by the "total number of records received" section (line 702), the "total number of records processed successfully" section (line 708), and "total number of records in error" section (line 714). Each of these three respective sections (lines 702, 708 and 714) is further divided into "number of cancel/repost records" sections (lines 704, 710 and 716, respectively) and "number of RTV records" sections (lines 706, 712, and 718, respectively). Accordingly, the APC Bridge File Report 700 provides a check as to whether or not all erroneous invoices sent from procurement have been fed into the AP Response Database system, thus, ensuring that erroneous invoices from procurement received into the AP Response Database are also fed for processing into the SAP® system.

In yet another embodiment of the invention, the invention provides a method of returning-to-vendor an erroneous invoice proffered by a vendor. The method comprises inputting a plurality of vendor invoices into a master database, sending invoice notification to respective requestors corresponding to each of the plurality of vendor invoices inputted into the master database, entering a return-to-vendor request from a requestor for the erroneous invoice and storing the return-to-vendor request from the requester for the erroneous invoice in a response database. Further, the method comprises executing an agent to extract data pertaining to the stored return-to-vendor request for the erroneous invoice from the response database, generating an intermediate file containing data extracted from the response database and executing a bridge program for delivering the intermediate file from the response database into the master database. The executing step further comprises first executing a delivery component for adding a header record and a trailer record to the intermediate file, and renaming the intermediate file. Further, the method comprises processing the intermediate file in the master database in order to return to vendor the erroneous invoice, and sending communication regarding the erroneous invoice to the vendor. The processing step further comprises adding text to the erroneous invoice in the master database corresponding to the return-to-vendor request entered in the response database and generating a reversal entry for the erroneous invoice in the master database. Further, the sending communication step further comprises sending communication to the vendor regarding the erroneous invoice with added text corresponding to the return-to-vendor request and sending a reversal invoice notification to the requestor for the erroneous invoice.

Referring to FIG. 1, when a requestor 102 wants to RTV (Return-to-vendor) an invoice, the requestor completes a RTV Request Form 103 (an example of which is shown in FIG. 2). The cancellation request data contained in the completed RTV Request Form (designated numeral 103 in FIG. 1) is stored or saved in a response database (designated by numeral 104), preferably, in the Lotus Notes® Accounts Payable (AP) Response Database. At the end of each business day, an agent, that is, a program within the Lotus Notes® Accounts Payable Response Database 104 is executed to extract (indicated by numeral 105) the pertinent information from all the completed RTV request forms 103 that have been stored in the response database 104. The agent creates (designated numeral 105) the intermediate file 106, preferably, a flat file 106, from all the RTV request forms 103 stored in the Lotus Notes® Accounts Payable Response Database 104, so that the flat file 106 can be automatically processed through the SAP® AP system. The agent names the flat file 106 in a specific format and stores the flat file 106 in a designated directory on a specified server, preferably, on the same server as the Lotus Notes® software system. The flat file 106 contains all of the information required by the SAP® Accounts Payable system to automatically RTV an erroneous invoice. Preferably, the flat file 106 contains the information pulled from each of the RTV request form (FIG. 2), such as, company code (240), SAP document number (270), SAP RTV Reasons (350), etc. Furthermore, the flat file 106 bridges directly form the Lotus Notes® Response Database 104 to the SAP® system via the SAP bridge program "IB_END_RTV". As explained herein above, the SAP bridge program "IB_END_RTV" is used to deliver the flat file 106 into the SAP® Accounts Payable system (as shown by the arrow designated by numeral 120). In particular, the agent or program that creates the flat file 106 is executed (depicted by the numeral 105 in FIG. 1) at a specified time, preferably, prior to any payment run, such that, the agent collects all the information in the RTV request forms 103 entered and stored in the Lotus Notes® Accounts Payable Response Database 104 and creates the flat file 106, such that the SAP® bridge IB_END_RTV can pick up the flat file 106 and begin processing the flat file in order to transfer the flat file 106 data into the SAP® system. Preferably, at a designated time after the expected time that the agent would have created/generated a flat file 106 on the Lotus Notes® Accounts Payable Response Database, the scheduled "cron job" (not shown in FIG. 1) is executed in the SAP® system, such that the "cron job" goes out to the Lotus Notes® Accounts Payable Response Database 104 and checks within a specified Lotus Notes® directory where the intermediate file or flat file 106 is supposed to be stored to see if there is a flat file 106 and, if so, the cron job triggers the execution of the SAP® delivery component "saprun" 108 (in FIG. 1) within the Lotus Notes® Accounts Payable Response Database 104.

The SAP® delivery component "saprun" 108 attaches the header record (as shown by numeral 109a) and trailer record (as shown by numeral 109b) to the flat file 106 and renames the flat file. The flat file with the attached header record and trailer record is designated by numeral 110 in FIG. 1. The successful execution of the SAP® delivery component "saprun" 108 (control point 123 in FIG. 1) triggers the execution of the SAP® bridge program IB_END_RTV in the SAP® system. In particular, the AIX® delivery component 112 goes and gets the flat file 110 (as shown by numeral 111 TCP/IP FTP(GET)) from the Lotus Notes® Accounts Payable Response Database server and brings it into the SAP® system server for processing. The AIX® delivery component 112 receives the flat file 110 in the SAP® system and verifies the presence of a header record and trailer record on the flat file 110 (control point 125 in FIG. 1) and, if successful, the SAP® IB_END_RTV bridge program receives the flat file into the SAP® system and continues to process the flat file 110. The AIX Delivery Component 112 looks up the name (indicated by numeral 114) of the flat file 110 and looks up the location (indicated by numeral 116) of the flat file 110 in the table ZSYSB 150. Once the flat file is brought into the SAP® system (indicated by numeral 120), the bridge program SAP® IB_END_RTV is executed to further process the file (indicated by numeral 122), as dictated by the respective Level 1, Level 2 and Level 3 programs (numeral 126, 130 and 136 in FIG. 1), such that, the SAP® bridge program IB_END_RTV opens up the flat file 110 and calls the execution of the ZCIV transaction 138 to process each line in the flat file 110. Again, the ZCIV transaction 138 creates (as indicated by the numeral 139a) an updated document 140 and creates (designated by 139b) a reversal document 142, which "zeros" out the invoice, thus, not paying the erroneous invoice. In particular, the ZCIV transaction creates an updated document 140 of the erroneous invoice corresponding to a particular line of the flat file 110 by adding a specific code (preferably, a three digit code) to the erroneous invoice explaining the particular reason why the invoice is being canceled and, in particular, being returned to the vendor.

As mentioned herein above and shown in FIG. 5, there are many reasons for returning an invoice, and each of the RTV reasons shown in rows 502 through 532 in column 550 of FIG. 5 has a specific "9xx" code (shown in column 550 of FIG. 6) that is linked via a table to the RTV reasons. For instance, in row 502 of FIG. 5, the field option "Third Party Billing" has a specific 9xx code, namely 901, that is associated with that particular RTV reason. Similarly, the RTV Reason in row 508 "Unit Cost on Invoice Does Not Agree with PO (Purchase Order)" in column 550 of FIG. 5 has the code 912 associated with it. Thus, the requestor picks the appropriate reason for returning the invoice, such that upon execution of the ZCIV transaction 138, the ZCIV transaction 138 adds the specific 9xx code (in the step designated by numeral 139a) to create an updated document 140 and the ZCIV transaction 138 creates (in the step designated by numeral 139b) a reversal or cancel document 142, thus, canceling the erroneous invoice in question. In a preferred embodiment, the ZCIV transaction updates an invoice field called "correspondence text" by adding the 9xx code in each corresponding invoice to be returned to the respective vendor. Preferably, when an erroneous invoice entry is reversed, the updated or reversal document 142 created in the SAP® system gets assigned a separate unique SAP® document number, which is different from the original SAP® document number on the erroneous invoice. Furthermore, preferably, an e-mail notification is sent to the requestor providing the requestor with the pertinent information regarding the cancellation of the erroneous invoice that is being returned to the vendor, along with the reversal document 142 information. As mentioned earlier, the process of canceling an invoice parallels the process of returning an invoice to vendor, except that when returning an invoice to a vendor, the process further involves automatically sending a communication or notification to the vendor or supplier explaining why the invoice is being returned.

In particular, once a reversal document 142 has been created in the SAP® Accounts Payable system, a "RTV job" or program is run in the SAP® system, which looks at all the reversed (updated) documents 140 that were created that day. More particularly, the RTV job looks for a 9xx code in the correspondence text field for a RTV. Further, the RTV job gathers the mandatory data and automatically populates a standard form for sending notification to the vendor/supplier. The notification is sent either electronically, that is, via e-mail for vendors that are EDI (Electronic Data Interchange) enabled or by mail (printed letter) to respective vendors telling each vendor why the invoice is being returned. The notification includes the specific 9xx code and the associated text (shown in column 550 of FIG. 5) explaining the reason why the invoice is being returned. Furthermore, the requester gets another notification containing the reversed document 142 information regarding the erroneous invoice that is returned to the vendor/supplier. If there is a 0xx code in a reversed document (for instance, when canceling an invoice), the RTV job ignores that document, thus, no notification is sent to the vendor when an invoice is simply being canceled.

Furthermore, in yet another embodiment, the invention provides a system that comprises a computer terminal or an equivalent device, a computer readable storage media or programmable media containing programmable software to automatically reverse a plurality of erroneous invoices proffered by one or more vendors. The programmable software comprises the steps of inputting into a master database, preferably, on a first server, a plurality of vendor invoices, sending invoice notification to respective requestors corresponding to each of the plurality of vendor invoices inputted into the master database, and storing, in a response database, reversal requests from a subset of the respective requestors corresponding to each of the plurality of erroneous invoices. In a preferred embodiment, the reversal request for the plurality of erroneous invoices comprises one of either canceling the invoice or returning to vendor the invoice. The programmable software further comprises executing, in the response database, an agent to extract data pertaining to each of the plurality of erroneous invoices from the response database, generating an intermediate file containing data extracted from the response database, executing a bridge program for delivering the intermediate file generated from the response database into the master database and processing, in the master database, the intermediate file to create a reversal entry for each of the erroneous invoices in the master database. The executing a bridge program step further comprises first executing a delivery component for adding a header record and a trailer record to the intermediate file and renaming the intermediate file. Moreover, the processing step further comprises adding text to each of the plurality of erroneous invoices in the master database corresponding to the reversal request entered in the response database, sending a reversal invoice notification to the subset of the respective requestors corresponding to each of the plurality of erroneous invoices and, if the erroneous invoice is processed as being returned to vendor, sending communication to a respective vendor regarding an erroneous invoice being returned to the vendor. Further, as described herein above, once the SAP® bridge program has completed running, a reconciliation report (SAP Bridge Control Totals Report) is generated (as shown in FIGS. 8A and 8B), showing the results of the automatic reversing of erroneous invoices.

In a preferred embodiment, the SAP® IB_END_RTV bridge program is made up of separate program modules or components. There is a main program component, which calls the other programs making up the module pool for the bridge. There is a separate module that defines all the variables needed for the programs in the bridge module pool. Further, there is a program component that contains the three function or level (1, 2 and 3) modules used for the inbound SAP® bridge. There is the main Level 1 program which validates the input file, performs controls measurements, maps input file data to an IFD (Interface Document) format to be used by the Level 2 programs. There is a separate component that contains the subroutines used in the main Level 1 program. Further, there is a program component that contains the input file layout definition used by the main Level 1 program to read the input file. The bridge program has another component that contains the interface document definition used by the main Level 1 program to create the interface document for the main Level 2 program. Moreover, there is the main Level 2 program which creates the BIF (Bridge Interface Document) from the IFD (Interface Document) of the main Level 1 program to build the BDC (Batch Data Communication) to cancel the invoice. Another program component that is part of the bridge program contains the subroutines used in the main Level 3 program. Further, there is a program component that contains the BIF definition used by the main Level 2 program to create the BIF for the main Level 3 program. Furthermore, there is the main Level 3 program which reads the BIFs created by the main Level 2 program and builds the BDC (Batch Data Communication) to call the custom transaction ZCIV to cancel the invoices. Moreover, there is a separate program component that contains the subroutines used by the main Level 3 program to perform the cancel transaction.

Similarly, in a preferred embodiment, the ZCIV transaction or program is made up of preferably several program components or modules. There is the main program of the ZCIV module pool. Another program component contains all the data declarations used in the ZCIV module pool (which includes SAP® table references & custom structures). Further, another program module retrieves any information required for the transaction from the database and prepares the screens for the input. Furthermore, a separate program does validations of data that was entered on the screens and performs the main functions of the ZCIV transaction, namely, updating an invoice and creating a reversal document. Moreover, another program module contains all the subroutines used by the ZCIV module pool. Furthermore, preferably, the agent that creates the flat file uses a specific template for extracting data from the request forms or documents in the response database and creates the flat file, that is, one line per form or document. Preferably, the agent creates the flat file, such that, the position of the data and the codes in the flat file can be read correctly by the bridge program. Once the data is extracted from the forms or documents, a field is set denoting that the respective documents have been read and that the information extracted from the forms has been put into the flat file for processing. The agent also generates a report with information about the documents that were processed successfully and those documents that were not processed successfully.

In a preferred embodiment, the agent code, the bridge program and the ZCIV transaction code are all written in the ABAP (Advanced Business Application Programming) language that SAP AG has used to develop all of the SAP® R/3 business modules, applications, and system management functions, and are designed for an IBM® compatible computer running under one of the Windows® family of operating systems.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of canceling a plurality of erroneous vendor invoices inputted into a master database stored on an accounts payable computer server, said method comprising:

providing a master database accounts payable computer server for inputting a plurality of vendor invoices, said master database accounts payable computer server including programmable media containing master database programmable software;

storing a cancellation request for each of said plurality of erroneous vendor invoices in a response database server, said response database server including programmable media containing response database programmable software;

executing an agent on said response database server to extract data pertaining to said cancellation request stored for each of said plurality of erroneous vendor invoices from said response database server;

creating on said response database server an intermediate file containing data extracted from said response database server;

executing a bridge program on said response database server for delivering said intermediate file from said response database server into said master database accounts payable computer server; and processing said intermediate file in said master database accounts payable computer server in order to cancel each of said plurality of erroneous vendor invoices in said master database accounts payable computer server; and entering a cancellation request for each of said plurality of erroneous vendor invoices proffered by one or more vendors in said response database server and adding text to said plurality of erroneous vendor invoices in said master database accounts payable computer server corresponding to said cancellation request entered in said response database server; and generating a reversal entry for each of said plurality of erroneous vendor invoices in said master database accounts payable computer sever.

2. A method according to claim 1, wherein said providing step a master database accounts payable computer server further comprises:

sending invoice notification to respective requestors corresponding to each of said plurality of vendor invoices inputted into said master database accounts payable computer server.

3. A method according to claim 1, wherein said executing a bridge program step further comprises:

executing a delivery component for adding a header record and a trailer record to said intermediate file; and renaming said intermediate file.

4. A method according to claim 1, wherein said response database server comprises a respective first server, and wherein said master database accounts payable computer server comprises a respective second server.

5. A method according to claim 4, wherein said intermediate file comprises a flat file.

6. A method according to claim 5, further comprising:

generating a summary report for passed and failed cancellation requests corresponding to each of said plurality of erroneous vendor invoices processed in said master database accounts payable computer server.

7. A method of returning-to-vendor an erroneous invoice proffered by a vendor, said method comprising:

inputting a plurality of vendor invoices into a master database accounts payable computer server;

sending invoice notification to respective requestors corresponding to each of said plurality of vendor invoices inputted into said master database accounts payable computer server, said master database accounts payable computer server including programmable media containing master database programmable software;

storing a return-to-vendor request from a requestor for said erroneous invoice in a response database server, said response database server including programmable media containing response database programmable software;

executing an agent to extract data pertaining to said stored return-to-vendor request for said erroneous invoice from said response database server;

generating an intermediate file containing data extracted from said response database server;

executing a bridge program on said response database server for delivering said intermediate file from said response database server into said master database accounts payable computer server;

processing said intermediate file in said master database accounts payable computer server in order to return to vendor said erroneous invoice; and sending communication regarding said erroneous invoice to said vendor; and adding text to said erroneous invoice in said master database accounts payable computer server corresponding to said return-to-vendor request entered in said response database accounts payable computer server; and generating a reversal entry for said erroneous invoice in said master database accounts payable computer server.

8. A method according to claim 7, wherein said executing a bridge program further comprises:

executing a delivery component for adding a header record and a trailer record to said intermediate file; and renaming said intermediate file.

9. A method according to claim 7, wherein said sending communication further comprises:

sending communication to said vendor regarding said erroneous invoice with added text corresponding to said return-to-vendor request; and sending a reversal invoice notification to said requestor for said erroneous invoice.

10. A method according to claim 9, wherein said intermediate file comprises a flat file.

11. A computer readable storage media containing programmable software to reverse a plurality of erroneous vendor invoices proffered by one or more vendors, said programmable software comprising instructions, which when executed by a processor performs the following steps:

inputting into a master database accounts payable computer server a plurality of vendor invoices;

sending invoice notification to respective requestors corresponding to each of said plurality of vendor invoices inputted into said master database accounts payable computer server;

storing, in a response database server, reversal requests from a subset of said respective requestors corresponding to each of said plurality of erroneous vendor invoices;

executing, in said response database server, an agent to extract data pertaining to each of said plurality of erroneous vendor invoices from said response database server;

generating an intermediate file containing data extracted from said response database server;

executing a bridge program on said response database server for delivering said intermediate file generated from said response database server into said master database accounts payable computer server; and processing, in said master database accounts payable computer server, said intermediate file to create a reversal entry for each of said erroneous vendor invoices in said master database accounts payable computer server; and adding text to each of said plurality of erroneous vendor invoices in said master database accounts payable computer server corresponding to said reversal request entered in said response database server;

sending a reversal invoice notification to said subset of said respective requestors corresponding to each of said plurality of erroneous vendor invoices; and sending communication to a respective vendor regarding an erroneous vendor invoice if said erroneous vendor invoice is processed as being returned to vendor.

12. A programmable media according to claim 11, wherein said reversal request for said plurality of erroneous vendor invoices comprises one of: canceling a respective vendor invoice inputted into said master database accounts payable computer server and returning to vendor a respective vendor invoice inputted into said master database accounts payable computer server.

13. A programmable media according to claim 12, wherein said executing a bridge program further comprises:

executing a delivery component for adding a header record and a trailer record to said intermediate file; and renaming said intermediate file.

* * * * *